Figure 1:
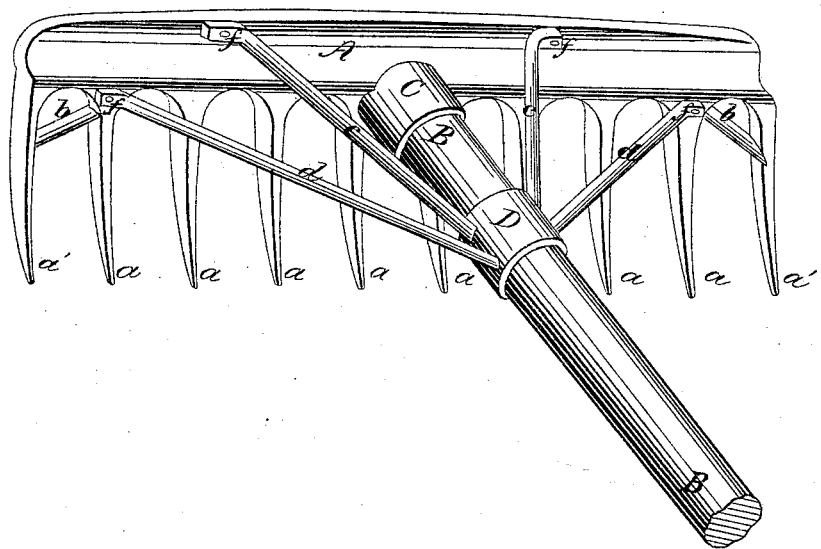

A. A. & A. HOTCHKISS.
Rake.

No. 18,339.

Patented Oct. 6, 1857.

UNITED STATES PATENT OFFICE.

A. A. HOTCHKISS AND A. HOTCHKISS, OF SHARON VALLEY, CONNECTICUT.

IMPROVEMENT IN RAKES.

Specification forming part of Letters Patent No. 18,339, dated October 6, 1857.

*To all whom it may concern:*

Be it known that we, A. A. HOTCHKISS and A. HOTCHKISS, of Sharon Valley, in the county of Litchfield and State of Connecticut, have invented certain new and useful Improvements in the Manufacture of Garden and other Rakes; and we do hereby declare that the following is a full, clear, and exact description of the same, reference being had to the accompanying drawing, making a part of this specification, and which represents in perspective a view of the rake in question.

The nature of our invention relates to the manufacture of rakes for farm or garden purposes which have double ferrules for the handles to pass through or into and braces to sustain the outer ferrule, which unite with it and with the top and bottom of the rake-head, as also braces to support the outside teeth, as will be explained.

To enable others skilled in the art to make and use our invention, we will proceed to describe the same with reference to the drawing.

A represents the rake-head, which may be slightly arched to give it strength with lightness, and having on it any suitable number of teeth, *a a a*, &c., curved in the usual manner, as seen in the drawing. The outer teeth, *a' a'*, of the series, having to sustain the greatest strain, are braced from the rake-head by braces *b b* to give them proper strength.

On the under side or edge of the rake-head is cast a ferrule, C, into or through which the end of the rake-handle B passes and is made fast. D is a second ferrule in line with the one C, but at some distance therefrom, and supported rigidly in its position by double sets of braces *c c* and *d d*, the former extending from said ferrule D to the top part of the rake-head, and the latter, which are longer than the other set, *c*, to the bottom part of the rake-head, where they are respectively secured by rivets or other similar device. Thus the ferrule D acts in relation to the one C as a long ferrule would, but is much lighter, while it possesses all the advantages of the long ferrule. The rake-handle B passes first through the ferrule D and thence into the one C, where it may be secured in any of the usual ways. The ferrule D and its braces *d d* and *e e* are cast in one piece, and the rake-head A, with its ferrule C, teeth *a*, and braces *b*, are cast in another piece, and the two are riveted together at *f f*, which forms the whole rake, making it firm, substantial, and very cheap.

Having thus fully described the nature of our invention, we would state that we are aware that cast-iron rakes have been made before, and that a ferrule has been braced from the rake-head by braces which were riveted to both the ferrule and rake-head. We therefore claim neither of these things; but

What we do claim as new, and desire to secure by Letters Patent, is—

The rake-head A, with its teeth *a*, ferrule C, and braces *b* in one piece, and casting the ferrule D, with its braces, in another piece, and uniting the two pieces together, substantially in the manner herein set forth, by which means we produce a new, cheap, and serviceable article of manufacture not heretofore known in the trade.

A. A. HOTCHKISS.
ANDREW HOTCHKISS.

Witnesses:
CHAS. F. SEDGWICK,
J. H. CLEAVELAND.